United States Patent
Lynn

(10) Patent No.: US 8,604,776 B2
(45) Date of Patent: Dec. 10, 2013

(54) POWER TRANSMISSION MONITORING AND MAINTENANCE SYSTEMS AND METHODS

(75) Inventor: William David Lynn, Portrush (GB)

(73) Assignee: Schrader Electronics Ltd., Antrim (GB)

( * ) Notice: Subject to any disclaimer, the term of this patent is extended or adjusted under 35 U.S.C. 154(b) by 329 days.

(21) Appl. No.: 12/803,332

(22) Filed: Jun. 24, 2010

(65) Prior Publication Data

US 2011/0316525 A1 Dec. 29, 2011

(51) Int. Cl.
*G01P 3/48* (2006.01)

(52) U.S. Cl.
USPC ........................................ 324/160

(58) Field of Classification Search
USPC ........... 324/17, 160–180; 198/810.01–810.04
See application file for complete search history.

(56) References Cited

U.S. PATENT DOCUMENTS

| | | | |
|---|---|---|---|
| 3,877,003 A * | 4/1975 | Kawashima | 340/681 |
| 6,237,752 B1 * | 5/2001 | El-Ibiary | 198/810.03 |
| 6,441,904 B1 * | 8/2002 | Shakespeare | 356/429 |
| 7,174,245 B2 * | 2/2007 | Ries-Mueller et al. | 701/51 |
| 7,624,857 B2 * | 12/2009 | Kusel | 198/502.4 |
| 7,864,067 B2 * | 1/2011 | Smith | 340/676 |
| 8,157,085 B2 * | 4/2012 | Furukawa et al. | 198/810.03 |
| 2002/0194903 A1 * | 12/2002 | IIzuka | 73/118.1 |
| 2003/0074986 A1 * | 4/2003 | Yamakawa et al. | 73/862.393 |
| 2004/0110584 A1 * | 6/2004 | Sawada et al. | 474/18 |
| 2004/0124736 A1 * | 7/2004 | Gauthier et al. | 310/258 |
| 2004/0209719 A1 * | 10/2004 | Ochiai et al. | 474/18 |
| 2005/0056100 A1 * | 3/2005 | Yuan et al. | 73/862.322 |
| 2006/0186875 A1 * | 8/2006 | Schroeder et al. | 324/163 |
| 2006/0219528 A1 | 10/2006 | Aizawa | |
| 2007/0200522 A1 * | 8/2007 | Kees et al. | 318/432 |
| 2008/0133051 A1 * | 6/2008 | Wallace et al. | 700/230 |
| 2009/0090603 A1 * | 4/2009 | Ricciardi et al. | 198/806 |
| 2009/0194390 A1 * | 8/2009 | Freeman | 198/810.01 |
| 2010/0029421 A1 * | 2/2010 | Mc Donald et al. | 474/70 |
| 2010/0035721 A1 * | 2/2010 | Rothenbuhler et al. | 477/45 |
| 2010/0131232 A1 * | 5/2010 | Taylor | 702/147 |
| 2011/0142634 A1 * | 6/2011 | Menke et al. | 416/46 |

* cited by examiner

*Primary Examiner* — Jermele M Hollington
*Assistant Examiner* — Demetrius Pretlow
(74) *Attorney, Agent, or Firm* — Holland & Hart LLP

(57) ABSTRACT

Power transmission monitoring systems includes rotation speed sensors mounted to hubs of a power transmission pulley. A sensor comprises a rotation sensing device, and a controller receiving rotation data therefrom and determining rotation speed of the pulley. A transmitter transmits rotational speed of the pulley to a receiver, which may include or be connected to a device that compares the rotational speed to rotational speed in transmissions from other sensors to determine slip in the power transmission system. The rotation speed sensing device may be an accelerometer, or a gravitational torque harvester. A harvester might include a rotor body rotating with the pulley and mounting induction coils, and a gravitational torque stator mounting an induction magnet and including an air vane damper maintaining the stator stationary with respect to the rotor, through air resistance. The transmissions may be employed to monitor, maintain and repair the power transmissions system.

28 Claims, 3 Drawing Sheets

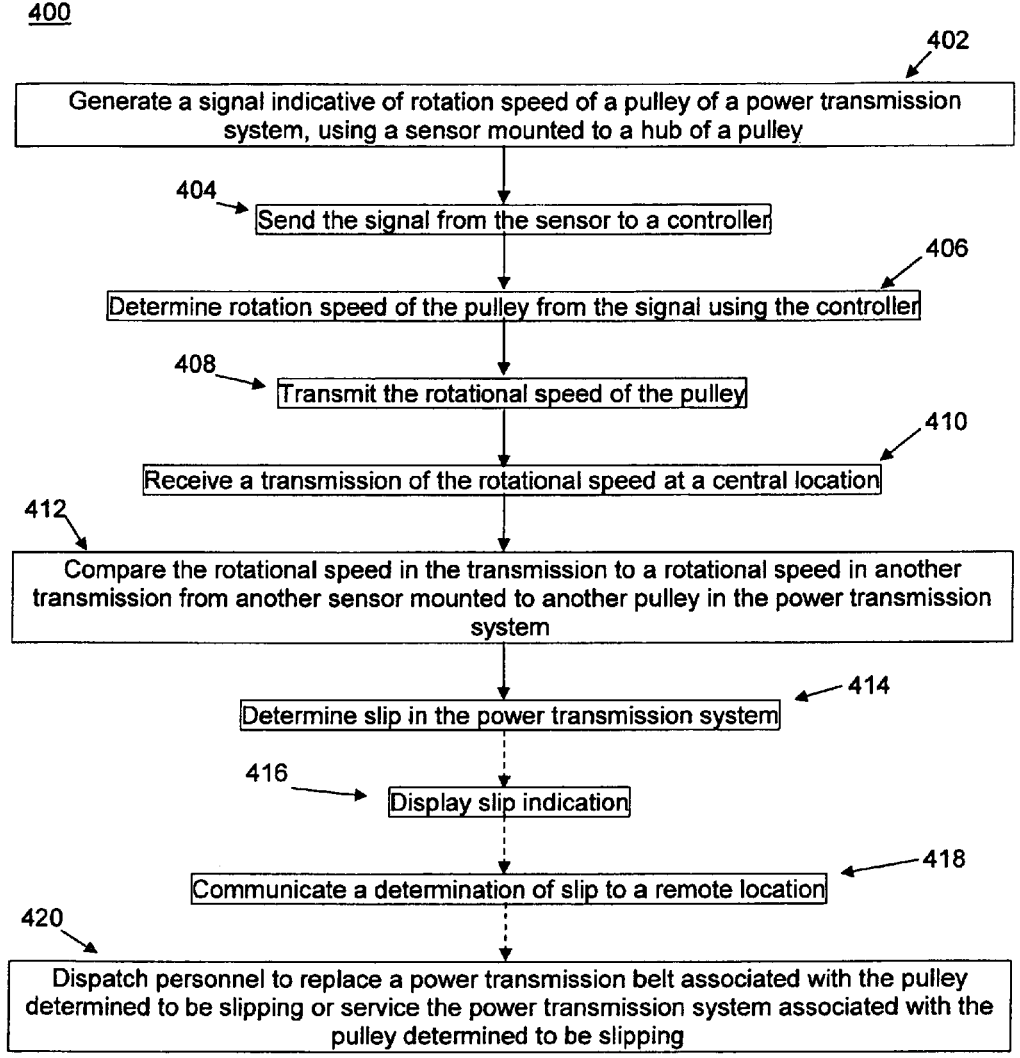

POWER TRANSMISSION MONITORING AND MAINTENANCE SYSTEMS AND METHODS

BACKGROUND

1. Field of the Invention

This invention relates generally to power transmission systems, more particularly monitoring and maintenance of power transmission systems, and specifically to monitoring of slip and the like of power transmission drives, such as belts, and other conditions, such as vibration in power transmission systems.

2. Description of the Prior Art

When a power transmission belt slip or skips the belt may overheat; the surface of the belt may become smooth and shiny, losing friction; bearings in the power transmission system may be shock loaded; the power transmission system loses efficiency; the belt may have a shorter life span; and/or system downtime may increase.

Traditionally the majority of industrial power transmission belt changes are carried out on a runtime or time interval basis. This is known as "Scheduled Preventative Maintenance." Such planned maintenance and regular belt tension checks, direct slip measurement using contact measurement such as pulse generators or slip rings and/or non-contact optical or magnetic sensor based systems are typically used to ensure industrial or mobile power transmission belt condition and integrity.

Other prior attempts to monitor the condition of power transmission belts or the like have required special modifications to the belt. For example, Gartland, U.S. Pat. No. 6,715,602 teaches incorporation of at least one dedicated sensor containing an endless loop to be purposely embedded into a conveyor belt in order to facilitate the detection and location of a rip in a conveyor belt. As another example, two patents issued to Ahmed, U.S. Pat. Nos. 6,523,400 and 6,532,810, teach the use of a dedicated closed loop wire or strip which is required to be embedded in a belt to facilitate detection of a break in the closed loop. In both cases embedding such sensors is expensive and requires special production methods and additional materials which are extraordinary to the normal use of the belt.

SUMMARY

The present invention is directed to systems and methods which provide power transmission system monitoring and maintenance. "Slip," as discussed herein may mean slip of a belt in a non-synchronous power transmission system, or in accordance with some embodiments skip of one or more teeth in a synchronous power transmission system, in that one pulley in the power transmission system rotates faster, or slower, than another pulley in the system, due to drag, obstruction, bearing wear, misalignment, incorrect belt tension, or the like, acting on the slower pulley, or the like. The present systems and methods are generally rotational drive monitoring systems and methods that can monitor drives that may or may not be belt driven. In accordance with various embodiments of the present systems and methods, slip and/or vibration are monitored directly, using sensors mounted directly on to the drive and driven pulleys, particularly, in accordance with some implementations, mounted direct on the hubs of the pulleys, at the center of rotation. These Hub Mounted Transmitters (HMTs) may be battery operated, or may use an energy scavenging technique to negate the need for a battery.

Various embodiments of a power transmission belt slip monitoring sensor might include a housing adapted to be attached, such as though the use of adhesives or the like, to, or incorporated into, a center hub of a power transmission pulley. To facilitate such deployment the housing may be cylindrical in shape. A rotation sensing device, such as an accelerometer or shock sensor is mounted in the housing. Alternatively, a gravitational torque harvester, discussed below, may be used as the rotation sensing device. A controller, also housed in the housing is operatively coupled to the rotation sensing device. The controller receives sensed rotation data from the rotation sensing device and may be used to determine rotation speed of the pulley from the sensed rotation data. A transmitter disposed in the housing is operatively coupled to the controller. The transmitter wirelessly transmits the rotational speed of the pulley, such as to a central receiving unit. In accordance with various embodiments an identification, unique relative to the sensor, may be transmitted along with the rotational speed information, to be used to help identify slipping pulleys. The rotation sensing device, the controller and/or the transmitter may be integrated into an Application Specific Integrated Circuit (ASIC).

As mentioned a gravitational torque harvester may be used as the rotation sensing device. Such a gravitational torque harvester may also be used to, at least partially, power the sensor. Such a gravitational torque harvester might be comprised of a rotor body adapted to rotate with the pulley. In some embodiments this rotor body may also function as the sensor housing. Regardless, the rotor body mounts a plurality of induction coils. A gravitational torque stator mounts an induction magnet and has an air vane damper, or the like, extending from it, or other mechanism to maintain the stator and the induction magnet stationary with respect to the rotor, as the rotor rotates with the pulley mounting the sensor.

In various embodiments of power transmission belt slip monitoring systems employing the above sensor, a central receiver receiving the transmission may include, or may be linked to, a central unit that compares the rotational speed in the transmission to rotational speed in other transmissions from other rotation speed sensors to determine slip in the associated power transmission system. In such systems the central unit may identify the rotational speed of each pulley in the power transmission system based up on the rotational speed and identification in each transmission.

Thus, in accordance with various embodiments of the present methods, a signal indicative of rotation speed of a pulley of a power transmission system is generated using a sensor mounted to a hub of the pulley. This rotational speed of the pulley is then wirelessly transmitted. To carry out such transmission, the signal from the sensor may first be sent to a controller housed in the sensor and the rotation speed of the pulley may be determined from the signal using the controller. The signal indicative of rotational speed may be an acceleration signal, such as might be provided by one or more accelerometers or shock sensors. Alternatively, the signal indicative of rotation speed may be an electrical signal generated by a gravitational torque harvester. Regardless, as discussed above, the transmission of rotational speed is received at a central location and the rotational speed in the transmission is compared to a rotational speed in another transmission from another sensor mounted to another pulley in the power transmission system to determine slip in the power transmission system. In some such systems, a determination of slip may be communicated to a remote location and personnel may be dispatched, based on the communication of slip, to replace a power transmission belt associated with the pulley determined to be slipping and/or to otherwise service the power transmission system associated with the pulley determined to be slipping The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 4 is a flowchart of an embodiment of the present methods for monitoring slip in a power transmission system.

DETAILED DESCRIPTION

Figure 1:
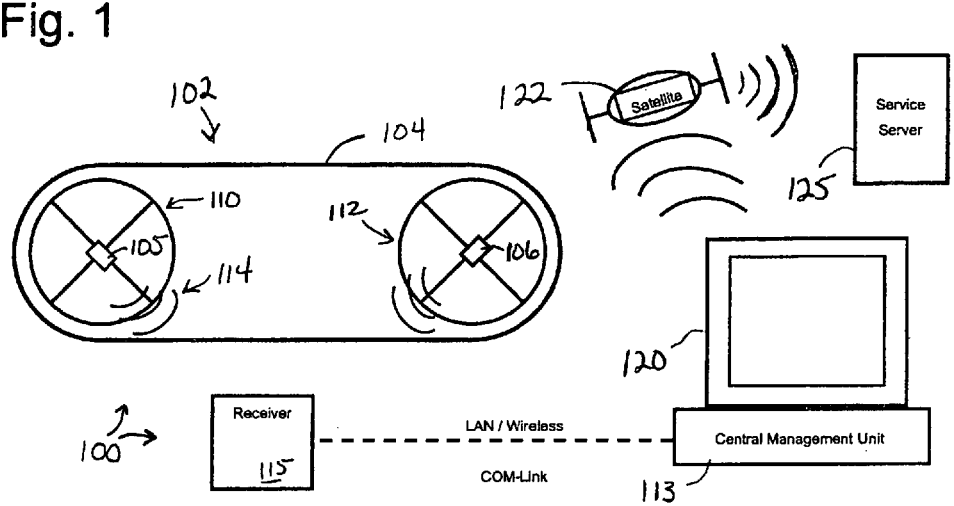
FIG. 1 is a diagrammatic environmental view of a power transmission system employing an embodiment of the present system for determining slip in the power transmission system.

The present systems and methods monitor various failure modes in rotational drive systems that may or may not be belt driven. While the present systems and methods are described herein with respect to slip, it should be appreciated that the present systems and methods can be used to monitor any number of rotational drive systems and related failure modes. FIG. 1 is a diagrammatic environmental view of power transmission system 102 employing an embodiment of present system 100 for determining slip in power transmission system 102. Sensing technologies embodied in system 100 might be expressly aimed at the industrial and manufacturing sector with a view to providing life data for consumable or wearing parts such a power transmission belts (104) or pulley bearings. However, the present systems and methods are also well adapted for use in automotive and/or mobile equipment power transmission systems as well. Real-time analysis of wearing parts offers a balance between part life and maintenance cost, allowing the implementation of active, reliability-centered maintenance. This means that it is possible to avoid costly downtime, allow longer change intervals, reduce running costs and cut the environmental impact of unnecessary replacement associated with power transmission systems. Preferably, the present sensor systems and methods prevent high wear or component damage, extend the equipment service life, and thus preserve capital value.

Figure 2:
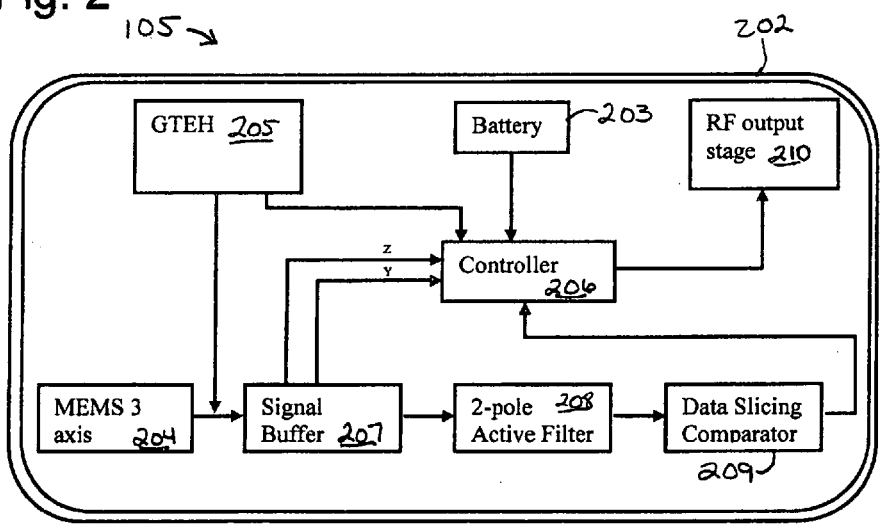
FIG. 2 is a diagrammatic block illustration of a sensor, in accordance with various embodiments.

Various embodiments of power transmission belt slip monitoring system 100 employ, two or more sensors 105, 106. FIG. 2 is a diagrammatic block illustration of exemplary sensor 105, in accordance with various embodiments. Sensor 105 is shown in FIG. 2, and described below, however, sensor 106 of FIG. 1, or other sensors used in associated, nearby or networked power transmission systems being monitored, may be similar to or even generally identical to sensor 105, other than an identification code associated with the sensor. Sensor 105 might include housing 202 adapted to be attached, such as though the use of adhesives or the like, to a center hub of a power transmission pulley 110, 112 of power transmission system 102. To facilitate such deployment housing 202 may be cylindrical in shape. Sensor 105 may be encapsulated using a potting material. Additionally or alternatively, housing 202 may be a LASER welded enclosure or a Low Pressure (LP) over-mould. Rotation sensing device 204, such as the illustrated three-axis accelerometer or one or more shock sensors are mounted in the housing. Alternatively, Gravitational Torque Energy Harvester (GTEH) 205, discussed in detail below, with respect to FIG. 3, may be used as a rotation sensing device. Also, GTEH 205 may be used to power sensor 105, rather than battery 203, and/or to supplement powered provided by battery 203. A micro controller (or ASIC) 206 is used to sample and process the accelerometer (or gravitational torque harvester wave) signal and provide a quantity representative of the rotational speed of the pulley and vibration information. Controller 206, also preferably housed in housing 202, is operatively coupled to rotation sensing device 204. Controller 206 receives sensed rotation data from the rotation sensing device, which may be in the form of a generally sinusoidal electrical wave generated by a piezoelectric accelerometer or shock sensor. The sensed rotational data from device 204 may be buffered in signal buffer 207 and conveyed to controller as an x-axis signal and a separate y-axis signal, as illustrated. Further, alternative active filter 208 and data slicing comparator 209 may provide a separate, comparison rotation data signal to controller 206. The sensed rotation data may be used, by controller 206 to determine rotation speed of pulley 110 or 112. An RF link is used to transmit the pulley data back to a central control unit (CCU) 113. Transmitter 210, illustrated as RF output stage 210, is disposed in housing 202 and operatively coupled to controller 206 to transmit the rotational speed of pulley 110 or 112. This transmission (114) may be received by the CCU's central receiving unit 115 of system 100. In accordance with various embodiments, one or more of rotation sensing device 204, controller 206 and transmitter 210 may be integrated into an ASIC, or the like.

In accordance with various embodiments a sensor unit identification, which is preferably relatively unique, at least within a particular power transmission system, facility, and/or amongst the power transmission systems being monitored by a particular monitoring system, may be transmitted along with the rotational speed information, such as in transmission 114. This identification information may be used to help identify which pulley in a system is slipping. In various embodiments of power transmission belt slip monitoring systems employing the above sensor, central receiver 115 may be a part of, or may be linked to, as illustrated in FIG. 1 central management unit 113. This central management unit my carry out functions such as comparing the rotational speed indicated in a transmission, such as from sensor 105 of FIG.

1, to a rotational speed indicated in other transmissions, such as from rotation speed sensor 106, to determine slip in power transmission system 102. In system 100, central unit 113 may identify the rotational speed of each pulley 110 and 112 in power transmission system 102, and resulting slip therebetween, based up on the rotational speed and identification in each transmission.

Figure 3:
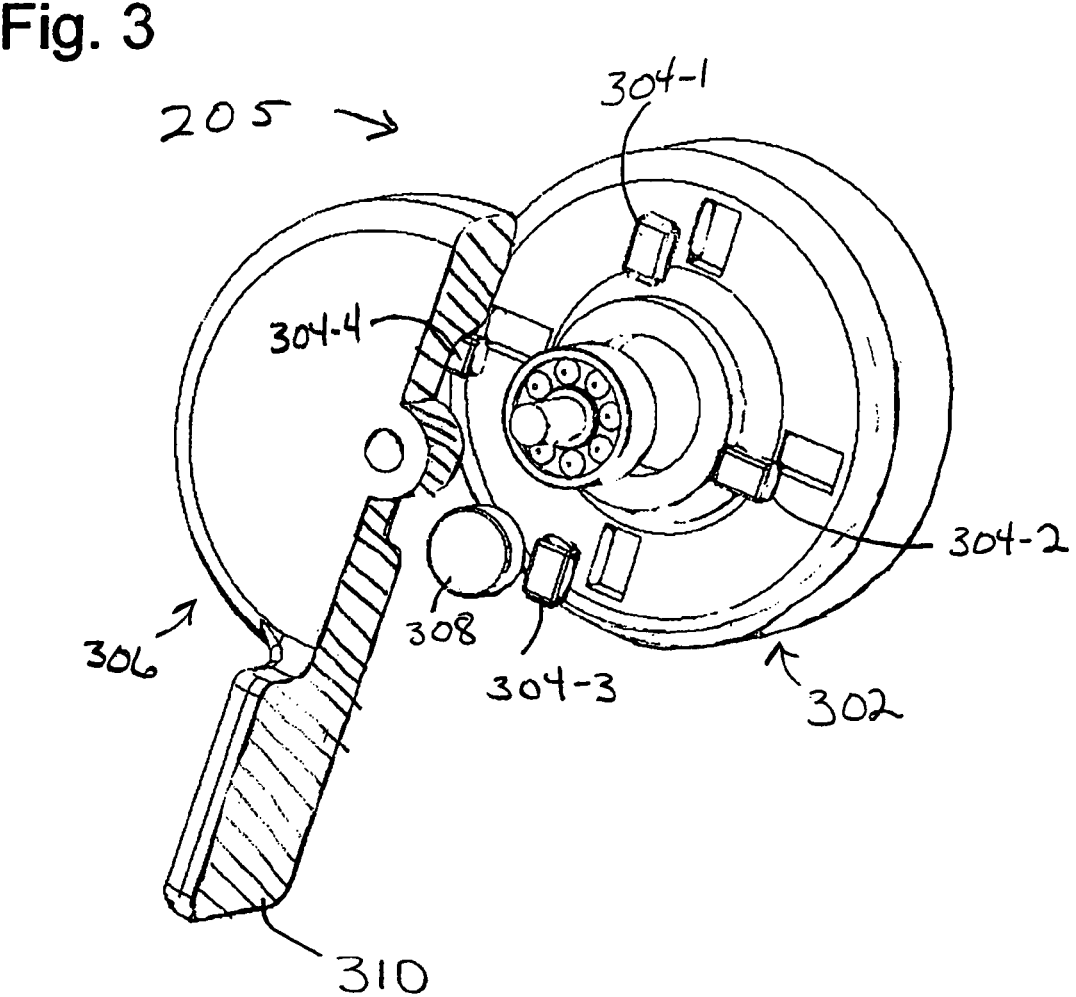
FIG. 3 is a partially exploded, partially fragmented, view of a an embodiment of a gravitational torque harvester.

FIG. 3 is a partially exploded, partially fragmented, view of an embodiment of gravitational torque energy harvester (GTEH) 205, which may be used in the present systems and/or by the present methods. As noted above, GTEH 205 may be used as the rotation sensing device. In particular, a representation of pulley speed may be derived using the phase angle of the generated wave from GTEH 205. GTEH 205 may also be used to, at least partially power the sensor. GTEH might be comprised of rotor body 302 adapted to rotate with the hub of the pulley on which it is mounted. In some embodiments rotor body 302 may be the sensor's housing, i.e. the other components of sensor 105, such as controller 206 and transmitter 210 may be housed in rotor body 302. Regardless, rotor body 302 mounts a plurality of induction coils 304-1 through 304-4. Gravitational torque stator 306 mounts at least one induction magnet 308 and has air vane damper 310 extending from it to maintain stator 306 and its induction magnet 308 stationary with respect to the rotor, as the rotor rotates with the pulley mounting the sensor. Gravitational torque is supported by fluid resistance techniques i.e. air resistance of air vane damper, which may be weighted. Other mechanisms may be employed to maintain stator 306 stationary with respect to rotor body 302, such as maintaining it stationary using an anchored static structure, etc. GTEH 205 is based on a rotational generator principle. The output wave provided by rotation of rotor body 302, and induction coils 304 disposed therewith, relative to stator 306's induction magnet 308, is sinusoidal and its frequency is dependent on rotational speed of rotor body 302, and hence the pulley to which it is mounted.

FIG. 4 is a flowchart of an embodiment of present method 400 for monitoring slip in a power transmission system. At 402 a signal indicative of rotation speed of a pulley of a power transmission system is generated using a sensor mounted to a hub of the pulley. The signal from the sensor may be sent to a controller at 404 and the rotation speed of the pulley may be determined from the signal using the controller at 406. As discussed above, the signal indicative of rotational speed may be an acceleration signal, such as might be provided by one or more accelerometers or shock sensors. Alternatively, as discussed in greater detail below, the signal indicative of rotation speed may be an electrical signal generated by a gravitational torque harvester. At 408 the rotational speed of the pulley is transmitted. The CCU receives and decodes the information from the HMT device. The transmission of rotational speed is received at a central location at 410 and a calculation of drive system slip can be calculated if two or more HMT's are used. For example, at 412 the rotational speed in the transmission is compared to a rotational speed in another transmission from another sensor mounted to another pulley in the power transmission system. Additionally, frequency domain analysis, such as Fourier analysis, is used to evaluate pulley vibration. At 414 a determination is made as to whether slip is occurring in the power transmission system being monitored. A determination of slip may be displayed at 416 or otherwise communicated. The system may be locally monitored through display screen 120, or the like, and/or it may also be networked using a MESH system or remotely monitored using a gateway technique. For example, at 418, a determination of slip may be communicated, such as via satellite 122, to a remote location, such as service center 125 and personnel may be dispatched at 420, based on the communication of slip, to replace power transmission belt 104 associated with the pulley determined to be slipping and/or to otherwise service the power transmission system associated with the pulley determined to be slipping Additionally, the present systems and methods may make use of sensors which employ the discussed sensing device, such as a three-axis accelerometer or one or more shock sensors are mounted in a housing, along with a micro controller (or ASIC) and transmitter for vibration sensing in a power transmission system, in addition to, or in place of sensor(s) 105 (and 106) discussed above. Such an alternative (or additional) sensor could be mounted to a bearing casing or the like of a bearing associated with a power transmission pulley to be monitored, to the hub of a power transmission system pulley as described with respect to sensor 105 above, or otherwise immediate the bearing being monitored. Such a sensor might be powered by a battery, or the like. As with sensor 105, such an alternative/additional sensor would transmit a signal to a central location for use in a manner similar to as discussed above with respect to FIG. 4, for monitoring, maintenance or repair of a monitored power transmission system. Such a transmission might include data concerning vibration sensed by the sensing device, and sampled and processed by the controller. The controller may receive sensed vibration data from the sensing device in the form of electrical waves generated by a piezoelectric accelerometer or shock sensor, which may form a vibration profile, which may be made up of multiple, superimposed waveforms. The sensed vibration data may be used, by the controller to determine a failure process associated with a change in vibration signature or intensity. Such a failure process could be pulley shaft imbalance or misalignment, bearing wear, overloading, or the like. Preferably, the collected vibration data is compared with a baseline vibration waveform for the power transmission system bearing being monitored to make such a determination and to assess severity of such a failure process. Again, in accordance with various embodiments, one or more of the sensing device, controller and transmitter may be integrated into an ASIC, or the like.

Additionally, the present systems and methods might employ detection of belt surface temperatures and/or belt surface reflective properties. Surface temperature may be an indicator of excessive loading or slip in a power transmission system. For example, a higher surface temperature may be noted at a run-off point from a drive pulley. Slip and therefore greater temperature increase may be detected at the run-off from the pulley with the least surface area. As a more specific example, in the case of an air handler drive, the smaller of a two pulley system is the drive pulley. In accordance with the present systems and methods the run-off from the drive pulley would show the greatest amount of thermal increase due to slip. Which, in accordance with various embodiments of the present systems and methods, may be detected using an optical/thermal sensor of the like and transmitted, wirelessly or via a hardwired means to a central unit or the like and employed in a monitoring, maintenance and/or repair methodology, such as discussed above with reference to FIG. 4.

Furthermore, as a result of the thermal excursions due to overload and or slip belts in non-synchronous power transmission systems tend to "polish"' which has the effect of increasing slip and therefore temperatures. Such a failure mode may be considered "exponential," in that a belt slipping through incorrect tension or drive overload may result in belt surface temperature increasing relatively dramatically. This, in turn, may cause the surface of the belt to liquefy, which may result in the belt surface "polishing" and the belt material hardening and stretching, which promotes further or more severe belt slip, resulting more polishing, etc. In accordance with various embodiments of the present systems and methods, an optical reflectance sensor may be incorporated into the belt monitoring system to monitor the belt surface for polishing. The reflectance sensor preferably has sufficient bandwidth to allow the monitoring of belt span vibration. Such span vibration may be used to provide information directly related to tension of the subject belt. Using:

$$T=4ml^2f^2$$

Where T is the tension in Newton's, m is the mass per unit length in Kg, l is the span length in meters and f is the vibration frequency in Hz.

The span vibration frequency will reduce as the tension reduces. Tension reduction may not result in immediate slip, therefore a pre-warning can be given of tension reduction in real-time employing the above discussed slip detection systems and methods.

Advantageously, the present systems and methods are well suited for wireless implementation and well adapted for retro-fit installations. Each sensor incorporates an accelerometer or device capable of monitoring not only the rotational frequency of the pulley on which it is mounted, but also a vibration profile of the pulley.

Also the present sensors continuously monitor and report condition of the belt drive system and prevent unforeseen failure of a power transmission belt due to excessive over-stressing through providing real time alerts/status of belt drive system to the customer (operator, service engineer, etc). Thereby, the present systems and methods help avoid unnecessary customer inconvenience (downtime, loss of productivity) and reduce service intervals, etc. Thus, the present systems and methods monitor slip in the belt drive, improving drive efficiency, saving money and energy.

As noted, the present systems and methods are generally rotational drive monitoring systems and methods that can monitor drives that may or may not be belt driven. While the present systems and methods are described herein with respect to slip, it should be appreciated that the present systems and methods can be used to monitor any number of rotational drive systems and related failure modes. For example, a monitored power transmission system might be gear driven, cable driven, etc. Regardless of the drive mechanism any number of causes may result in poor system performance. For example, drive failures or reduced operating efficiencies that the present systems and methods may be used to detect and address might include impending bearing failure, poor drive lubrication or out of balance components that can add resistance, overloading a drive, inducing slip or slowing down a drive. As a further example, pump cavitations can cause a drive to operate at an increased speed, which can be detected in accordance with the present invention, and realized as an indication of a drive problem and loss of pumping efficiency. Drive pulsing or unusual speed variation, is another example of drive mode failure that may be detected by the present systems and methods, and which may possibly occur due to a broken windmill blade, pump impellor blade break or bend, causing speed fluctuations. Excessive stretch in Chain drives, resulting in excessive backlash may be detectable by the present systems and methods, and/or a gear in a gear driven system could have a broken tooth that is detectable under the present systems and methods.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power transmission monitoring sensor comprising:
a housing mounted directly to a hub of a power transmission pulley, wherein said housing is mounted at the center of rotation of said pulley, the housing comprising:
a rotation sensing device;
a controller operatively coupled to said rotation sensing device, said controller configured to receive sensed rotation data from said rotation sensing device and determine a rotation speed of said pulley from said sensed rotation data;
a transmitter operatively coupled to said controller configured to transmit said rotation speed of said pulley and
a gravitational torque harvester comprising a rotor body adapted to rotate with said pulley, wherein said rotor body mounts a plurality of induction coils, and a gravitational torque stator mounting an induction magnet and comprising means for maintaining said stator and said induction magnet stationary with respect to said rotor body.

2. The sensor of claim 1, wherein said housing is cylindrical.

3. The sensor of claim 1, wherein said housing is adhesively coupled to said hub of said power transmission pulley.

4. The sensor of claim 1, wherein said housing is cylindrically formed about said hub of said pulley.

5. The sensor of claim 1, wherein said rotation sensing device is an accelerometer.

6. The sensor of claim 1, wherein said rotation sensing device is a shock sensor.

7. The sensor of claim 1, wherein said means for maintaining said stator and said induction magnet stationary with respect to said rotor body comprises an air vane damper.

8. The sensor of claim 1, wherein said housing comprises said rotor body.

9. The sensor of claim 1, wherein said gravitational torque harvester powers said sensor.

10. The sensor of claim 1, wherein at least one of said rotation sensing device, said controller and said transmitter comprise an application specific integrated circuit.

11. The sensor of claim 1, wherein said transmitter transmits identification unique relative to said sensor with said rotation speed.

12. A power transmission monitoring system comprising:
a rotation speed sensor mounted to a hub of a power transmission pulley in a power transmission system, said rotation speed sensor comprising:
a rotation sensing device;
a controller operatively coupled to said rotation sensing device configured to receive sensed rotation data from said rotation sensing device and determine a rotation speed of said pulley from said sensed rotation data;

a transmitter operatively coupled to said controller configured to transmit said rotation speed of said pulley; and a gravitational torque harvester comprising a rotor body adapted to rotate with said pulley, wherein said rotor body mounts a plurality of induction coils, and a gravitational torque stator mounting an induction magnet and comprising means for maintaining said stator and said induction magnet stationary with respect to said rotor;

a receiver configured to receive said transmission of said rotation speed of said pulley; and means for comparing said rotation speed in said transmission to at least one rotation speed in other transmissions from other rotation speed sensors and determining a slip in said power transmission system.

13. The system of claim 12, wherein said transmitter transmits identification, unique relative to said sensor, along with said rotation speed, and wherein said means for comparing further comprises means for identifying the rotation speed of each pulley in said power transmission system, based upon the rotation speed and identification in each transmission.

14. The system of claim 12, wherein said rotation sensing device is an accelerometer.

15. The system of claim 12, wherein said rotation sensing device is a shock sensor.

16. The system of claim 12, wherein said gravitational torque harvester powers said rotation speed sensor.

17. The system of claim 12, wherein at least one of said rotation sensing device, said controller and said transmitter comprise an application specific integrated circuit.

18. The system of claim 12, wherein said means for maintaining said stator and said induction magnet stationary with respect to said rotor body comprises an air vane damper.

19. A method comprising:
generating a signal indicative of a rotation speed of a pulley of a power transmission system, using a sensor mounted to a hub of said pulley;
transmitting said rotation speed of said pulley; and
determining a slip in said power transmission system based upon a comparison of said rotation speed of said pulley and a rotation speed of at least one other pulley in said power transmission system,
wherein said signal is an electrical signal generated by a gravitational torque harvester.

20. The method of claim 19, further comprising:
sending said signal from said sensor to a controller.

21. The method of claim 20 wherein said signal is an acceleration signal.

22. The method of claim 21 wherein said sensor is an accelerometer.

23. The method of claim 21 wherein said sensor is a shock sensor.

24. The method of claim 19 further comprising:
receiving a transmission of said rotation speed at a central location; and wherein said determining is performed at the central location.

25. The method of claim 24, further comprising communicating any determination of slip to a remote location.

26. The method of claim 25 further comprising dispatching personnel based on the communication of slip to replace a power transmission belt associated with the pulley determined to be slipping.

27. The method of claim 25 further comprising dispatching personnel based on the communication of slip to service the power transmission system associated with the pulley determined to be slipping.

28. The method of claim 19 wherein said transmitting further comprises transmitting identification unique relative to said sensor with said rotation speed.

* * * * *